(12) United States Patent
Xue et al.

(10) Patent No.: US 10,669,394 B2
(45) Date of Patent: Jun. 2, 2020

(54) POLYAMIDE COMPOSITIONS WITH HIGH MELT FLOW AND GOOD MECHANICAL PROPERTIES

(71) Applicant: BASF SE, Ludwigshafen (DE)

(72) Inventors: Siqi Xue, Suzhou (CN); Shu Kui Wang, Shanghai (CN); Ying Ying Dai, Shanghai (CN)

(73) Assignee: BASF SE, Ludwigshafen (DE)

( * ) Notice: Subject to any disclaimer, the term of this patent is extended or adjusted under 35 U.S.C. 154(b) by 68 days.

(21) Appl. No.: 15/736,803

(22) PCT Filed: May 31, 2016

(86) PCT No.: PCT/EP2016/062277
§ 371 (c)(1),
(2) Date: Dec. 15, 2017

(87) PCT Pub. No.: WO2016/202577
PCT Pub. Date: Dec. 22, 2016

(65) Prior Publication Data
US 2018/0179361 A1   Jun. 28, 2018

(30) Foreign Application Priority Data

Jun. 19, 2015   (WO) ................ PCT/CN2015/081961

(51) Int. Cl.
| | | |
|---|---|---|
| C08K 5/06 | (2006.01) | |
| C08L 77/06 | (2006.01) | |
| C08K 7/14 | (2006.01) | |
| C08L 77/02 | (2006.01) | |
| C08K 5/20 | (2006.01) | |
| C08L 71/02 | (2006.01) | |
| C08G 65/34 | (2006.01) | |

(52) U.S. Cl.
CPC .................. C08K 5/06 (2013.01); C08K 5/20 (2013.01); C08K 7/14 (2013.01); C08L 77/02 (2013.01); C08L 77/06 (2013.01); C08G 65/34 (2013.01); C08L 71/02 (2013.01); C08L 2205/02 (2013.01); C08L 2205/06 (2013.01)

(58) Field of Classification Search
CPC .......... C08L 77/00; C08L 71/02; C08L 71/08; C08G 65/34; C08K 5/06
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,393,210 A | 7/1968 | Speck |
| 4,537,949 A | 8/1985 | Schmidt et al. |
| 4,540,772 A | 9/1985 | Pipper et al. |
| 4,820,771 A | 4/1989 | Mussig et al. |
| 5,081,222 A | 1/1992 | Reimann et al. |
| 6,194,538 B1 | 2/2001 | Weiss et al. |
| 6,699,960 B1 | 3/2004 | Ohlbach et al. |
| 8,563,680 B2 * | 10/2013 | Prusty ..................... C08L 71/02 524/377 |
| 2006/0235191 A1 | 10/2006 | Deininger et al. |
| 2009/0012229 A1 | 1/2009 | Desbois et al. |
| 2013/0338263 A1 | 12/2013 | Tao et al. |

FOREIGN PATENT DOCUMENTS

| | | |
|---|---|---|
| DE | 19947631 A1 | 6/2000 |
| DE | 10313681 A1 | 10/2004 |
| EP | 38094 A2 | 10/1981 |
| EP | 38582 A2 | 10/1981 |
| EP | 39524 A1 | 11/1981 |
| EP | 129195 A2 | 12/1984 |
| EP | 129196 A2 | 12/1984 |
| EP | 299444 A2 | 1/1989 |
| EP | 922065 A2 | 6/1999 |
| EP | 1041109 A2 | 10/2000 |
| EP | 1198491 A1 | 4/2002 |
| EP | 1424360 A1 | 6/2004 |
| EP | 1994075 A2 | 11/2008 |
| JP | 2001214068 A * | 8/2001 |

OTHER PUBLICATIONS

DIALOG Machine translated English language equivalent of JP 2001-214068 (2019, 7 pages).*
JPLAT Machine translated English language equivalent of Application JP 2000-025508, which is the same as the Publication JP 2001-214068, as evidenced by the foreign document (2019, 11 pages).*
CAS Registry No. 31694-55-0 (2019, 1 page).*
Zytel 70G33L (Dupont, 2019, 4 pages).*
CAS Abstract of JP 2001-214068 (2019, 3 pages).*
International Search Report for PCT Patent Application No. PCT/EP2016/062277, dated Aug. 16, 2016.

* cited by examiner

Primary Examiner — Brieann R Johnston
(74) Attorney, Agent, or Firm — Marshall, Gerstein & Borun LLP

(57) ABSTRACT

A polyamide composition with improved melt flow containing (A) 20 to 99.9 wt % of one or more polyamides independently selected from the group consisting of aliphatic polyamide, semi-aromatic polyamide, aromatic polyamide and their blends, (B) 0.1 to 10 wt % of one or more polyether polyols having a melting temperature below room temperature, (C) 0 to 70 wt % of one or more reinforcing agents, and (D) 0 to 50 wt % of one or more other additives, each based on the whole composition. A molding article produced from the polyamide composition also is disclosed.

7 Claims, No Drawings

POLYAMIDE COMPOSITIONS WITH HIGH MELT FLOW AND GOOD MECHANICAL PROPERTIES

CROSS-REFERENCE TO RELATED APPLICATIONS

This application is the U.S. National Phase of PCT/EP2016/062277, filed May 31, 2016, which claims the benefit of PCT Patent Application No. PCT/CN2015/081961, filed on Jun. 19, 2015.

FIELD OF THE INVENTION

The present invention relates to a polyamide composition with improved melt flow and molding articles produced therefrom.

BACKGROUND OF THE INVENTION

Polyamides, especially at high glass fiber filling, may have low melt flow. The compounds are difficult for injection molding, especially for thin-wall parts and for parts with complex geometry, leading to failure at part molding or parts with bad surfaces, and poor properties.

EP1041109 disclosed PA composition containing 0.005 to 5 parts of a polyhydric alcohol having a melting point of 150 to 280° C. to improve the melt flow. More specifically, the polyhydric alcohol is pentaerythritol and/or dipentaerythritol.

There remains a need for a polyamide composition with improved melt flow from which it is possible to produce molding articles with good mechanical properties.

SUMMARY OF THE INVENTION

An object of the present invention is to provide a polyamide composition with improved melt flow.

The present inventor has found that the above-described object can be attained by a polyamide composition comprising the following components,
(A) 20 to 99.9 wt % of one or more polyamides independently selected from the group consisting of aliphatic polyamide, semi-aromatic polyamide, aromatic polyamide and their blends, based on the whole composition;
(B) 0.1 to 10 wt % of one or more polyether polyols having a melting temperature below room temperature, based on the whole composition;
(C) 0 to 70 wt % of one or more reinforcing agents, based on the whole composition; and
(D) 0 to 50 wt % of one or more other additives, based on the whole composition.

The other aspects of the invention are further to provide a molding article produced from the polyamide composition mentioned above, the use of the polyether polyols for improving the melt flow of the polyamide composition and the use of the polyether polyols for improving the surface gloss of the molding article.

DETAILED DESCRIPTION OF THE INVENTION

The present invention will hereinafter be described more specifically.

Unless defined otherwise, all technical and scientific terms used herein have the same meaning as commonly understood by one of ordinary skill in the art to which this invention belongs.

In the present invention, room temperature means a temperature of 25° C.

Expressions "a", "an", "the", when used to define a term, include both the plural and singular forms of the term.

The polyamides according to the present invention generally have an intrinsic viscosity of from 90 to 350 ml/g, preferably from 110 to 240 ml/g, determined in a 0.5% strength by weight solution in 96% strength by weight sulfuric acid at 25° C. according to ISO 307.

Preference is given to semicrystalline or amorphous resins with a molecular weight (weight average) of at least 5000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycapryllactam, and polylaurolactam, and also polyamides obtained via reaction of dicarboxylic acids with diamines.

Dicarboxylic acids which may be used are alkanedicarboxylic acids having from 2 to 36, in particular from 6 to 10, carbon atoms, and aromatic dicarboxylic acids. Merely as examples, acids that may be mentioned here are adipic acid, azelaic acid, sebacic acid, dodecanedioic acid and terephthalic and/or isophthalic acid.

Suitable diamines are alkanediamines having from 2 to 12, in particular from 6 to 8, carbon atoms, and also m-xylylenediamine (MXDA) (e.g. Ultramid X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl) propane, and 1,5-diamino-2-methylpentane.

Preferred polyamides are polyhexamethyleneadipamide, polyhexamethylenesebacamide, and polycaprolactam, poly1,9-nonamethyleneterephthalamide, polydecamethylene terephthalamide and also polycaprolactam/hexamethyleneadipamide (PA6/66) copolyamides, in particular having a proportion of from 5 to 95% by weight of caprolactam units (e.g. Ultramid® C31 from BASF SE).

Other suitable polyamides are obtainable from ω-aminoalkylnitriles, e.g. aminocapronitrile (PA6) and adiponitrile with hexamethylenediamine (PA66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (PA46). Preparation processes for polyamides of this structure are described by way of example in EP-A 38094, EP-A 38582, and EP-A 39524.

Other copolyamides which have proven particularly advantageous are semiaromatic copolyamides, such as PA6T/6 and PA6T/66, where the triamine content of these is less than 0.5% by weight, preferably less than 0.3% by weight (see EP-A 299444). Other polyamides resistant to high temperatures are known from EP-A 1994075 (PA6T/6I/MXD6). The processes described in EP-A 129195 and 129196 can be used to prepare the preferred semiaromatic copolyamides with low triamine content.

Other polyamides are amorphous polyamides that have glass transition temperatures between 100 and 180° C. The amorphous polyamides are homopolymers, copolymers, terpolymers or higher polymers that are derived from different monomers, such as PA6I/6T, PAMACM12.

The following list, which is not comprehensive, comprises the polyamides A) mentioned and other polyamides A) for the purposes of the invention, and the monomers comprised:
AB Polymers:
PA4 Pyrrolidone
PA6 ε-Caprolactam
PA7 Ethanolactam
PA8 Capryllactam
PA9 9-Aminopelargonic acid
PA11 11-Aminoundecanoic acid
PA12 Laurolactam
AA/BB polymers:
PA46 Tetramethylenediamine, adipic acid
PA66 Hexamethylenediamine, adipic acid
PA69 Hexamethylenediamine, azelaic acid
PA610 Hexamethylenediamine, sebacic acid
PA612 Hexamethylenediamine, decanedicarboxylic acid
PA613 Hexamethylenediamine, undecanedicarboxylic acid
PA1212 1,12-Dodecanediamine, decanedicarboxylic acid
PA1313 1,13-Diaminotridecane, undecanedicarboxylic acid
PA6T Hexamethylenediamine, terephthalic acid
PA9T 1,9-Nonanediamine, terephthalic acid
PA10T decanediamine, terephthalic acid
PAMXD6 m-Xylylenediamine, adipic acid
PA6I Hexamethylenediamine, isophthalic acid
PA6-3-T Trimethylhexamethylenediamine, terephthalic acid
PA6/6T (see PA6 and PA6T)
PA6/66 (see PA6 and PA66)
PA66/6 (see PA6 and PA66)
PA6/12 (see PA6 and PA12)
PA66/6/610 (see PA66, PA6 and PA610)
PA6I/6T (see PA6I and PA6T)
PA6T/6I (see PA6T and PA6I)
PAPACM12 Diaminodicyclohexylmethane, dodecandioic acid
PA6I/6T/PACM as PA 6I, PA6T, diaminodicyclohexylmethane
PA12/MACMI Laurolactam, dimethyldiaminodicyclohexylmethane, isophthalic acid
PA12/MACMT Laurolactam, dimethyldiaminodicyclohexylmethane, terephthalic acid
PAPDA-T Phenylenediamine, terephthalic acid Most preferred polyamides are aliphatic polyamides, such as PA6, PA66, PA6/66, PA46, semi-aromatic polyamide, such as PA6T/6, PAMXD6, PA9T, PA10T, PA6I/6T, and their blends.

The polyamides are used in an amount of 20 to 99.9 wt %, preferably 30 to 80 wt %, more preferably 40 to 65 wt %, based on the whole composition.

The polyether polyols used in the present invention are obtained by known methods, for example by alkoxylation of at least one multifunctional starter molecule in the presence of alkali metal hydroxides such as sodium or potassium hydroxide or alkali metal alkoxides such as sodium methoxide, sodium or potassium ethoxide or potassium isopropoxide, or Lewis acids such as antimony pentachloride, boron trifluoride etherate or bleaching earth, and also double metal cyanide compounds, known as DMC catalysts.

The starter molecule may have two or more functional groups. The functional groups can be hydroxyl, carboxyl, amino, glycidyl, isocyanate, ester and amide. In one starter molecule, the functional groups may be the same or different.

The starter molecule having two or more hydroxyl groups can be 1,2,4-butane triol, 1,2,5-pentane triol, 1,2,6-hexane triol, glycerol, diglycerol, triglycerol, tetraglycerol, pentaglycerol, hexaglycerol, triethanolamine, trimethylol ethane, 2-methylpropane triol, 2-methyl-1,2,4-butane triol, pentaerythritol, dipentaerythritol, tripentaerythritol, 1,3,5-trihydroxy benzene, 1,2,4-trihydroxy benzene; and saccharides, such as cyclodextrin, mannose, glucose, sorbitol, xylitol. In particular, glycerol, diglycerol, pentaerythritol, dipentaerythritol are preferred.

The starter molecule having two or more carboxyl groups can be 1,2,3-propane tricarboxylic acid, 2-methyl-1,2,3-propane tricarboxylic acid, 1,2,4-butane tricarboxylic acid, 1,2,3,4-butane tetracarboxylic acid, trimellitic acid, trimesic acid, pyromellitic acid, benzene pentacarboxylic acid, 1,2,4-cyclohexane tricarboxylic acid, 1,3,5-cyclohexane tricarboxylic acid, 1,2,4,5-cyclohexane tetracarboxylic acid, 1,2,4-naphthalene tricarboxylic acid, 2,5,7-naphthalene tricarboxylic acid, 2,4,6-pyridine tricarboxylic acid, 1,2,7,8-naphthalene tetracarboxylic acid, 1,4,5,8-naphthalene tetracarboxylic acids, citric acid; and polycarboxylic acids, such as methacrylic polymers; and the acid anhydrides thereof. Among them, 1,2,3-propane tricarboxylic acid, citric acid and trimellitic acid are preferred.

The starter molecule having two or more amino functional groups may have primary or secondary amines. Primary amine is preferred. The starter moleculars can be diamines, triamines and tetraamines, such as ethylene diamine, dietheylene diamine, toluene diamine, 1,2,3-triaminopropane, 1,2,3-triamino-2-methylpropane, 1,2,4-triaminobutane, 1,2,3,4-tetraamino butane, 1,3,5-triaminocyclohexane, 1,2,4-triaminocyclohexane, 1,2,3-triaminocyclohexane, 1,2,4,5-tetraaminocyclohexane, 1,3,5-triaminobenzene, 1,2,4-triaminobenzene, 1,2,3-triaminobenzene, 1,2,4,5-tetraaminobenzene, 1,2,4-triaminonaphthalene, 2,5,7-triaminonaphthalene, 2,4,6-triaminopyridine, 1,2,7,8-tetraaminonaphthalene, 1,4,5,8-tetraaminonaphthalene and the like. Ethylene diamine, dietheylene diamine, toluene diamine, 1,2,3-triaminopropane, 1,3,5-triaminocyclohexane, 1,3,5-triaminobenzene are preferred.

The starter molecule may also have two or more functional group of glycidyl group, isocyanate group, ester group, amide group.

The starter molecule preferably has hydroxyl and/or amino functional groups.

The polyether polyols contain one or more alkylene oxide units grafted to the functional groups of the starter molecule through alkoxylation reaction. The aliphatic alkylene oxide units contain 2 to 4 carbon atoms, including ethylene oxide, propylene oxide, 1,2-butylene oxide, 2,3-butylene oxide or isobutylene oxide. In the present invention, especially preferred is ethylene oxide and propylene oxide units.

The alkylene oxide units may continuously react with the alkoxylated starter molecule. The number of repeating alkylene oxide units per functional group is 0.1 to 20, preferably from 0.5 to 10.

Preferred polyether polyols are (poly)ethylene oxide and/or (poly)propylene oxide reacted with glycerol, diglycerol, triglycerol, pentaerythritol, dipentaerythritol, tripentaerythritol, ethane diamine, diethane diamine, toluene diamine, sorbitol, triaminopropane, triaminobenzene.

The polyether polyols used in the present invention have a weight average molecular weight of 50 to 10000 g/mol, preferably 100 to 7500 g/mol, more preferably 200 to 3000 g/mol. The molecular weight can be determined using GPC (gel permeation chromatography), using hexafluoroisopropanol as a solvent and polymethylmethacrylate as reference.

The polyether polyols used in the present invention all have liquid form at room temperature. The viscosity at room temperature is preferably less then 70000 mPa·s.

The polyether polyols are used in an amount of 0.1 to 10 wt %, preferably 0.5 to 8 wt %, more preferably 1 to 7 wt %, based on the whole composition.

The reinforcing agents C) that may be mentioned are fibrous or particulate fillers, for example carbon fibers, glass fibers, glass beads, amorphous silica, calcium silicate, calcium metasilicate, magnesium carbonate, kaolin, chalk, powdered quartz, mica, barium sulfate, and feldspar.

Preferred fibrous fillers that may be mentioned are carbon fibers, aramid fibers, and potassium titanate fibers, particular preference being given to glass fibers in the form of E glass with round or non-circular section. These can be used as rovings or in the commercially available forms of chopped glass.

The fibrous fillers may have been surface-pretreated with a silane compound to improve compatibility with the polyamides. Preferred silane compounds are aminopropyltrimethoxysilane, aminobutyltrimethoxysilane, aminopropyltriethoxysilane and aminobutyltriethoxysilane, and also the corresponding silanes which comprise a glycidyl group.

The amounts of the silane compounds generally used for surface-coating are from 0.01 to 2% by weight, preferably from 0.025 to 1.0% by weight and in particular from 0.05 to 0.5% by weight (based on C)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the polyamides. Addition of the lamellar or acicular nano fillers to the inventive nanocomposites gives a further increase in mechanical strength.

The reinforcing agents are used in an amount of 0 to 70 wt %, preferably 5 to 60 wt %, more preferably 30 to 55 wt %, based on the whole composition.

The other additives D) used in the present invention are those common for polyamide composition which are not the reinforcing agents C), for example, independently selected from the group consisting of stabilizers, anti-oxidants, lubricant, flame retardants, chain-extenders, colorants, necleating agents, plasticizers, impact modifiers, polymer blend components, and the mixtures thereof.

The other additives are used in an amount of 0 to 50 wt %, preferably 0.1 to 40 wt %, more preferably 0.5 to 30 wt %, based on the whole composition.

The polyamide composition of the invention can be produced by processes known per se, by mixing the starting components in conventional mixing apparatuses, such as screw-based extruders, especially twin-screw extruders, Brabender mixers, or Banbury mixers, and then extruding the same. The extrudate can be cooled and pelletized. It is also possible to premix individual components and then to add the remaining starting materials individually and/or likewise in the form of a mixture.

The mixing temperatures are generally from 230 to 350° C., preferably 260 to 330° C.

In another preferred mode of operation, components B) and also optionally C) and D) can be mixed with a prepolymer of component A), compounded, and pelletized. The resultant pellets are then solid-phase condensed under an inert gas continuously or batchwise at a temperature below the melting point of component A) until the desired viscosity has been reached.

The polyamide composition of the invention features excellent flow. These materials are therefore suitable for producing fibers, foils and moldings of any type with good mechanical properties. Some examples are now given: plug connectors, plugs, plug parts, cable harness components, circuit mounts, circuit-mount components, three-dimensionally injection-molded circuit mounts, electrical connection elements, mechatronic components, consumer electronic parts, etc.

In addition, the processing costs can be reduced due to improved processability.

The moldings or semifinished products to be produced in the invention from the polyamide composition can be used by way of example in the motor vehicle industry, electrical industry, electronics industry, telecommunication industry, information technology industry, entertainment industry, or computer industry, or in vehicles and other conveyances, in ships, in spacecraft, in households, in office equipment, in sports, in medicine, in parts of buildings, in the kitchen and household sector for producing components for kitchen devices, e.g. fryers, smoothing irons, and knobs, and also applications in the garden and leisure sector, and in general for thin-wall parts and parts with complex geometry.

The present invention will hereinafter be described in further detail by Examples. Concerning each evaluation, the measurement was carried out in accordance with the below-described manner.

EXAMPLES

PA66 is a commercial grade Ultramid A27 obtained from BASF. It has a viscosity number of 142-158 ml/g according to DIN EN ISO 307.

PA6I/6T is Selar PA3426 obtained from DuPont. It is a copolymer with an intrinsic viscosity of 0.82 dL/g measured according to ASTM D5225.

PA6T/6 is a BASF internal product with a viscosity number of 118-134 ml/g.

Polyether polyol (PEOL) A is ethylene oxide and propylene oxide alkoxylated toluene diamine with a molecular weight around 550 g/mol. It has a viscosity of 9800-15800 mPa·s at room temperature, under the commercial name Lupranol VP9345 from BASF.

PEOL B is ethylene oxide alkoxylated glycerol with a molecular weight around 2000 g/mol. It has a viscosity of 1400-2000 mPa·s at room temperature, under commercial name GJ-9701 obtained from Sinopec.

PEOL C is propylene oxide alkoxylated ethane diamine with a molecular weight around 300 g/mol. It has a viscosity of 30000-55000 mPa·s at room temperature, under commercial name Lupranol 3700 obtained from BASF.

Glass fiber is FT2A from Owens Corning.

Additives are Irganox 1098 stabilizer from BASF, ethylene bisstearamid (EBS) as lubricant obtained from Croda, and carbon black master batch (CB MB) containing 30% carbon black in PA6, obtained from Clariant.

All examples and comparative examples were prepared by melt blending all ingredients (as shown in Tables 1 and 2, in wt %) using a 25 mm twin-screw Berstorff extruder under typical compounding conditions (compounding temperature 280-320° C., throughput 25 Kg/h, screw speed 350 rpm). The materials were then injection molded into ISO specimens for testing.

Tensile properties (strength, modulus and elongation) were measured according to ISO527-2. Charpy impact strength was measured according to ISO179/1eU. MVR was measured according to ISO1133 using the temperature and weight load marked in table 1. Flow spiral length is determined by injection molding the material into a 2 mm thick spiral mold at constant 300° C. melt temperature, 60° C. mold temperature, 500 bar injection pressure and 60 ccm injection speed. The length of the injected spiral was then measured to indicate the flow of the material. The longer the length is, the better flow the material has. Surface gloss was measured according to ISO 2813 using 60° incidence angle.

The results are shown in Tables 1 and 2.

Example 5 and Comparative Example 3 were both based on PA66 reinforced by 50% glass fiber. Example 5, containing 4% PEOL, showed much higher MVR and spiral flow length compared with Comparative Example 3.

Example 6 and Comparative Example 4 were both based on PA6T/6 reinforced by 50% glass fiber. Example 6, containing 4% PEOL, showed higher MVR and spiral flow length compared with Comparative Example 4.

Example 2 and Comparative Example 5 were both based on PA66 and PA6I/6T reinforced by 50% glass fiber. Example 2, containing 4% PEOL, showed better surface gloss. Comparative Example 5, containing 2% pentaerythritol, as claimed in EP1041109, showed poor surface gloss.

Except in the Examples, or where otherwise explicitly indicated, all numerical quantities in this description specifying amounts of materials, reaction conditions, molecular

TABLE 1

|  | Comp. Ex. 1 | Ex. 1 | Ex. 2 | Ex. 3 | Comp. Ex. 2 | Ex. 4 | Comp. Ex. 3 | Ex. 5 | Comp. Ex. 4 | Ex. 6 |
| --- | --- | --- | --- | --- | --- | --- | --- | --- | --- | --- |
| PA66 | 29 | 29 | 27 | 27 | 68 | 61 | 48 | 44 | | |
| PA6I/6T | 19 | 18 | 17 | 17 | | | | | | |
| PA6T/6 | | | | | | | | | 48 | 44 |
| Glass fiber | 50 | 50 | 50 | 50 | 30 | 30 | 50 | 50 | 50 | 50 |
| Irganox 1098 | 0.3 | 0.3 | 0.3 | 0.3 | 0.3 | 0.3 | 0.3 | 0.3 | 0.3 | 0.3 |
| EBS | 0.7 | 0.7 | 0.7 | 0.7 | 0.7 | 0.7 | 0.7 | 0.7 | 0.7 | 0.7 |
| CB MB | 1 | 1 | 1 | 1 | 1 | 1 | 1 | 1 | 1 | 1 |
| PEOL A | | 1 | | | | | | | | |
| PEOL B | | | 4 | | | 7 | | 4 | | 4 |
| PEOL C | | | | 4 | | | | | | |
| Tensile strength (MPa) | 229 | 222 | 223 | 232 | 176 | 177 | 228 | 237 | 244 | 240 |
| E-Modulus (MPa) | 16200 | 16300 | 16600 | 17200 | 9500 | 9800 | 16000 | 17000 | 16800 | 17500 |
| Elongation at break (%) | 2.5 | 2.4 | 2.4 | 2.3 | 2.9 | 3.8 | 2.8 | 2.8 | 2.4 | 2.4 |
| Notched charpy impact (kJ/m$^2$) | 14.1 | 12.5 | 12.6 | 13.9 | 9.5 | 11.8 | 15.5 | 17.4 | 12.5 | 14.3 |
| Unnotched charpy impact (kJ/m$^2$) | 120.5 | 111.9 | 106.1 | 115.1 | 74.5 | 79.8 | 104.5 | 97.6 | 94.4 | 87.6 |
| MVR @ 5 Kg (cc/10 min) | 16 (275° C.) | 25 (275° C.) | 73 (275° C.) | 24 (275° C.) | 48 (275° C.) | 96 (275° C.) | 44 (295° C.) | 58 (295° C.) | 12 (300° C.) | 44 (300° C.) |
| Spiral flow length (cm) | 43 | 47 | 59 | 47 | 48 | 62 | 46 | 48 | 42 | 45 |

TABLE 2

|  | Comp. Ex. 5 | Ex. 2 |
| --- | --- | --- |
| PA66 | 28 | 27 |
| PA6I/6T | 18 | 17 |
| Glass fiber | 50 | 50 |
| Irganox 1098 | 0.3 | 0.3 |
| EBS | 0.7 | 0.7 |
| CB MB | 1 | 1 |
| Pentaerythritol | 2 | |
| PEOL B | | 4 |
| Surface gloss 60° | 4 | 37 |

Example 1, 2, 3 and Comparative Example 1 were all based on PA66 and PA6I/6T reinforced by 50% glass fiber. Example 1, 2 and 3 containing different PEOLs at different loadings showed higher MVR and higher spiral flow length than Comparative Example 1. Example 1, 2 and 3 showed good mechanical properties.

Example 4 and Comparative Example 2 were both based on PA66 reinforced by 30% glass fiber. Example 4, containing 7% PEOL, showed much higher MVR and spiral flow length, and even better impact strength compared with Comparative Example 2.

weights, number of carbon atoms, and the like, are to be understood as modified by the word "about".

It is to be understood that the upper and lower amount, range, and ratio limits set forth herein may be independently combined. Similarly, the ranges and amounts for each element of the invention can be used together with ranges or amounts for any of the other elements.

The present invention is not to be limited in scope by the specific embodiments and examples described herein. Indeed, various modifications of the invention in addition to those described herein will become apparent to those skilled in the art from the foregoing description. Such modifications are intended to fall within the scope of the appended claims.

The invention claimed is:

1. Polyamide composition comprising the following components,
    (A) 40 to 65 wt % of one or more polyamides independently selected from the group consisting of aliphatic polyamide, semi-aromatic polyamide, aromatic polyamide and their blends, based on the whole composition;
    (B) 1 to 7 wt % of one or more polyether polyols having a melting temperature below room temperature, based on the whole composition;

(C) 30 to 55 wt % of one or more reinforcing agents, based on the whole composition; and (D) 0.5 to 30 wt % of one or more other additives, based on the whole composition, wherein the one or more polyether polyols are (poly)ethylene oxide and/or (poly)propylene oxide reacted with one or more of glycerol, diglycerol, triglycerol, pentaerythritol, dipentaerythritol, tripentaerythritol, ethane diamine, diethane diamine, toluene diamine, sorbitol, triaminopropane and triaminobenzene, and wherein the polyether polyols have a weight average molecular weight of 200 to 3000 g/mol.

2. The polyamide composition according to claim 1, wherein the polyamides are selected from the group consisting of PA6, PA66, PA6/66, PA46, PA6T/6, PAMXD6, PA9T, PA10T, PA6I/6T, and their blends.

3. The polyamide composition according to claim 1, wherein the reinforcing agents are selected from the group consisting of carbon fibers, glass fibers, glass beads, amorphous silica, calcium silicate, calcium metasilicate, magnesium carbonate, kaolin, chalk, powdered quartz, mica, barium sulfate, feldspar, and mixtures thereof.

4. The polyamide composition according to claim 1, wherein the other additives D) are independently selected from the group consisting of stabilizers, anti-oxidants, lubricant, flame retardants, chain-extenders, colorants, necleating agents, plasticizers, impact modifiers, polymer blend components, and mixtures thereof.

5. A molding article produced from the polyamide composition according to claim 1.

6. A method of increasing a melt flow rate (ISO 1133) of a polyamide composition comprising including a polyether polyol which is (poly)ethylene oxide and/or (poly)propylene oxide reacted with one or more of glycerol, diglycerol, triglycerol, pentaerythritol, dipentaerythritol, tripentaerythritol, ethane diamine, diethane diamine, toluene diamine, sorbitol, triaminopropane, and triaminobenzene in the polyamide composition, wherein the polyether polyol has a weight average molecular weight of 200 to 3,000 g/mol.

7. A method of increasing the surface gloss 60° (ISO 2813)of a molding article produced from a polyamide composition comprising including a polyether polyol in the polyamide composition, wherein the polyether polyol is (poly)ethylene oxide and/or (poly)propylene oxide reacted with one or more of glycerol, diglycerol, triglycerol, pentaerythritol, dipentaerythritol, tripentaerythritol, ethane diamine, diethane diamine, toluene diamine, sorbitol, triaminopropane, and triaminobenzene, and the polyether polyol has a weight average molecular weight to 200 to 3,000 g/mol.

* * * * *